P. WOODTHORPE.
MOTOR VEHICLE HAVING FRICTION TRANSMISSION.
APPLICATION FILED MAR. 29, 1915.

1,281,471.

Patented Oct. 15, 1918.
3 SHEETS—SHEET 1.

Witnesses
C. A. Krug
Jas. E. Hutchinson

Inventor
Percy Woodthorpe
By Bacon & Milans
Atty's

P. WOODTHORPE.
MOTOR VEHICLE HAVING FRICTION TRANSMISSION.
APPLICATION FILED MAR. 29, 1915.

1,281,471.

Patented Oct. 15, 1918.
3 SHEETS—SHEET 2.

Witnesses:
C. A. Kray
Jas E Hutchinson

Inventor
Percy Woodthorpe
By Bacon & McLane
Atty's

P. WOODTHORPE.
MOTOR VEHICLE HAVING FRICTION TRANSMISSION.
APPLICATION FILED MAR. 29, 1915.

1,281,471.

Patented Oct. 15, 1918.
3 SHEETS—SHEET 3.

Witnesses:
C. A. Kreig
Jas. E. Hutchinson

Inventor
Percy Woodthorpe
By Bacon & Milans
Attys

UNITED STATES PATENT OFFICE.

PERCY WOODTHORPE, OF NORTH FINCHLEY, LONDON, ENGLAND.

MOTOR-VEHICLE HAVING FRICTION TRANSMISSION.

1,281,471.  Specification of Letters Patent.  Patented Oct. 15, 1918.

Application filed March 29, 1915. Serial No. 17,763.

*To all whom it may concern:*

Be it known that I, PERCY WOODTHORPE, a subject of the King of Great Britain, and a resident of 10 Hilton avenue, North Finchley, London, N., England, have invented new and useful Improvements in or Relating to Motor-Vehicles Having Friction Transmission, of which the following is the specification.

This invention relates to improvements in motor vehicles in which a friction drive or transmission is employed.

The objects of my invention are to provide a means of mounting the engine and frictional transmission gear as one unit upon the frame of the vehicle in order to prevent the slip which occurs between the two frictional members chiefly owing to their undesired relative movement arising from the distortion of the vehicle frame when running and to provide a better frictional engagement with less liability to slip.

I provide means embodied on the said unit for a better connection between the movable friction member and the driven shaft.

According to this invention I mount the engine and frictional transmission members together upon one frame of rectangular or horseshoe form preferably having one end open. The two side members or fork of the open ended rectangular frame are supported at their ends upon, and are either rigidly or flexibly secured to, one member of the main frame of the vehicle, while a single projecting lug in the center of the transverse arm of the rectangular frame serves to secure the unit frame to another member of the vehicle frame. The engine is mounted preferably on the open end of the fork of the rectangular frame, while the frictional members are mounted closely adjacent the engine upon the other end of the said rectangular frame. This arrangement provides a three point suspension for the combined unit, namely engine and friction gear, which prevents slip between the two friction members when running, due to distortion of the main frame. The friction transmission mounted in this manner, preferably near the said lug which forms one point of suspension cannot have conveyed to one frictional member independently the twisting of the vehicle frame.

With the like object of a better frictional engagement reducing slip, I provide a flexible joint formed of known arrangement of flexible disks, so constructed that the driving or driven disk may not only be pressed into frictional engagement on the other member of the friction drive, but may also be readily withdrawn or retracted, owing to the construction of the said disk joint, from frictional engagement with the other said member.

I provide preferably on the driven shaft a flanged hub integrally formed or rigidly secured in any suitable manner near one end of the driven shaft, which is mounted in suitable bearings. A similar flange is either integrally formed or similarly secured to the jointed continuation of this shaft, upon which shaft the friction disk or roller is adapted to slide. Rigidly secured to each of the said flanges is a leather, rubber, steel or the like disk or annulus. The two said flexible disks or the like are riveted or suitably secured at their peripheral edges, they thus provide a perfectly flexible connection, permitting of an arc movement of the shaft carrying said sliding friction member while rotated.

The said flanged hub is integrally formed with or is secured on a coned or tapered end of the shaft provided with a key. I provide a projecting hollow cylindrical extension on the end of said shaft within which is adapted to fit a projecting portion from the other shaft having a curved peripheral surface fitting the said inner cylindrical surface. By this means the jointed shaft end upon which the friction member is adapted to slide is capable of three movements, that of rotation by means of the flexible disk connection, and by the same means an arc movement may be given the said friction member to withdraw it from engagement with the other said friction member, or to press it into contact therewith, and simultaneously an endwise or longitudinal movement may be given to the said flexible jointed shaft.

It will be observed that the said construction and combination provides a more effective frictional drive than has hitherto been obtained, and eliminates the slip due to twisting of the main frame, which so frequently occurs.

And in order that my invention may be completely understood reference should be made to the accompanying sheets of drawings which illustrate one example thereof:—

A is the main frame of the chassis. B is the subsidiary frame for the power and transmission gear having three point suspension. C, C$^1$, C$^2$ are the three points of suspension.

In the example shown the subsidiary frame for the power and transmission unit is placed at the rear of the chassis but it will be understood that it may be placed in the front. D is the engine, the flywheel D$^1$ of which serves as one transmitting frictional disk. The other disk E is placed as usual at right angles to the first disk D$^1$ and is mounted on the shaft F upon which it is adapted to slide. The frictional engagement of the two disks transmits the power in the usual manner, and the sliding of the periphery of the disk E over the face of the disk D$^1$ serves to vary the speed, also in known manner. The engine D is mounted on the front of the subsidiary frame, and the main transmission bearing G of the shaft is also mounted on one side of this frame. The other bearing H is mounted on a lever H, the fulcrum H$^2$ of which is secured to the frame by the bracket H$^3$. The lever H$^1$ has connected at its upper end the spring I which is adjustably secured at its other end to the frame. The spring serves to always press the disk E carried by the shaft F into frictional engagement with the disk D$^1$. The lower end of the lever H$^1$ is connected by the link J, see Figs. 1, 2 and 3, to the clutch pedal J$^1$, by which the disk E is taken out of frictional engagement with the disk D$^1$.

The other end of the shaft F is provided with the flexible joint K. The shaft has fitted thereto or integrally formed with it the flange F$^1$. To the flange F$^1$ is bolted the inner edge of a disk of leather or other suitable flexible material K$^1$. At its peripheral edge is secured by bolts or the like a similar flexible disk K$^2$ which is secured at its inner or central hole to the flange L$^1$ integrally formed with the short length of shaft L, mounted in the main bearing G which in this example consists of the two ball bearing rings G$^1$ G$^2$.

The hollow cylindrical extension O, on the end of the shaft F serves to receive the projecting end O$^1$ of the short shaft L. The projection O$^1$ has a curved peripheral surface permitting of the slight arc movement thereon of the cylindrical extension O and also permitting of slight longitudinal extension of the shafts relatively, owing to the yielding of the flexible joint.

Figure 1:
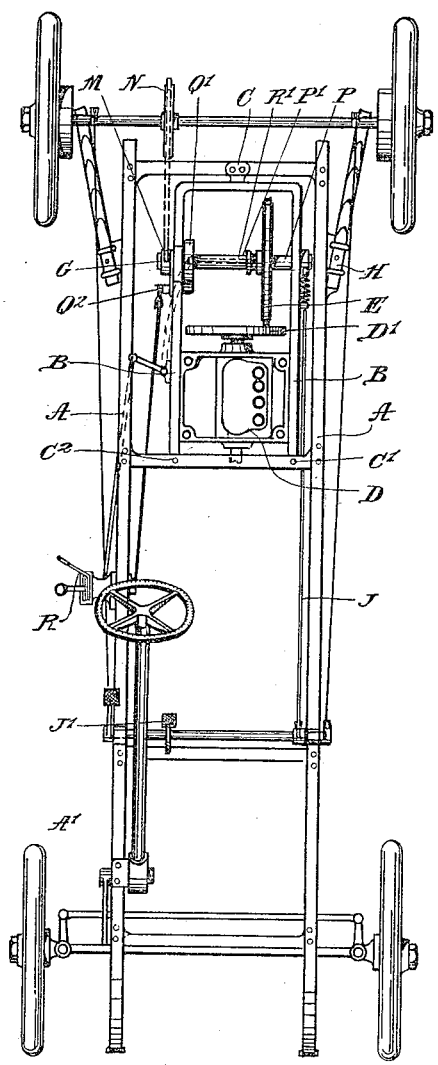
Figure 1 is a plan of the chassis.

On the shaft L, between the two ball rings is fitted the sprocket wheel M which is connected by chain to a sprocket N on the back axle, see Fig. 1, for driving the back wheels.

The flexible collapsible casings P, P$^1$ are provided to completely inclose the sliding shafts on each side of the disk E. They are formed of canvas or the like secured to a coiled spring and are thus capable of extension and of closing in accordance with the sliding movement of the disk E. Each spring is under sufficient compression to always keep closed the ends of the casings at the maximum extension of the springs. Grease is filled into the casings for lubricating purposes. The covers also serve to keep out mud and dust.

Surrounding and partly inclosing the flexible joint K is the brake drum Q which is rigidly secured to the short draft L. The band brake Q$^1$ is operated by the lever Q$^2$ in known manner.

Figure 2:
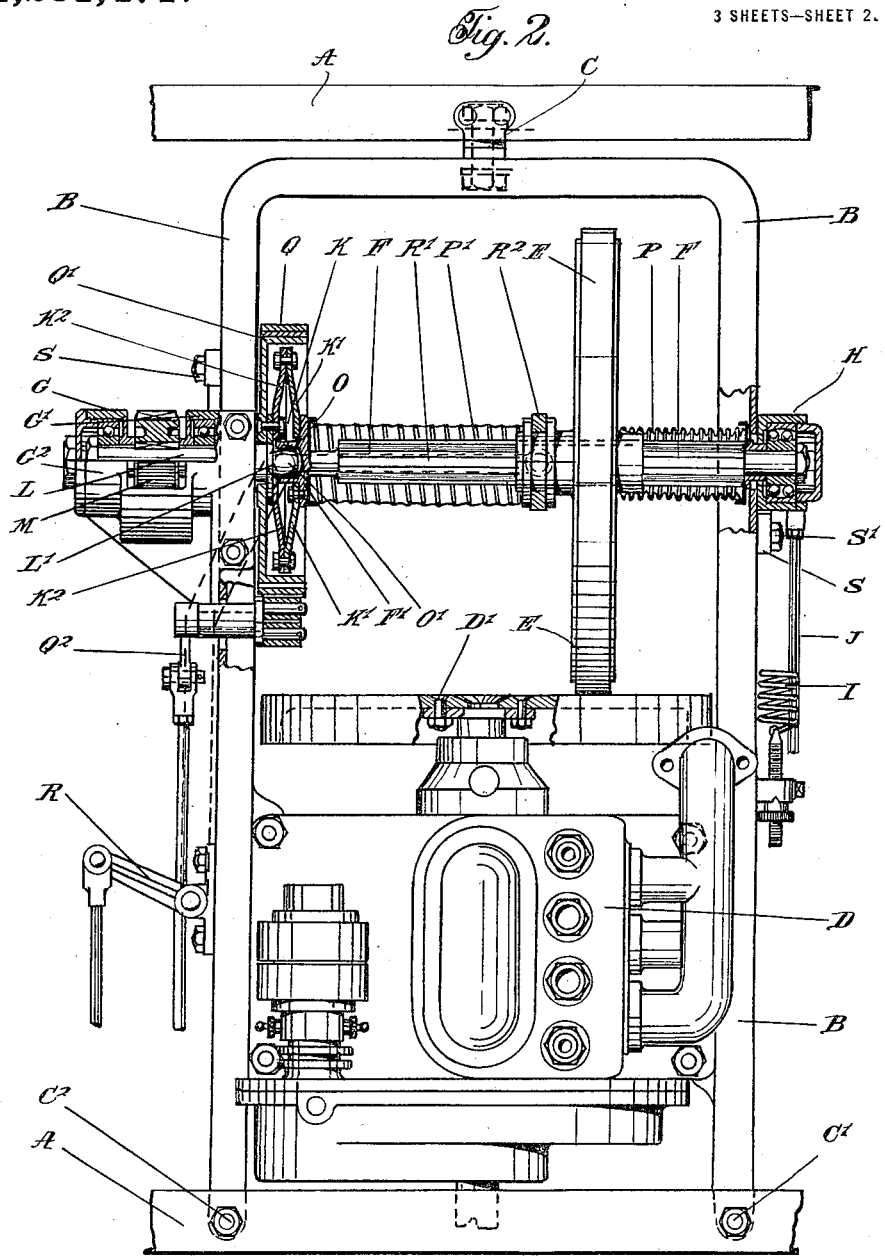
Fig. 2 is a plan of the power and transmission unit to a larger scale.
Figure 3:
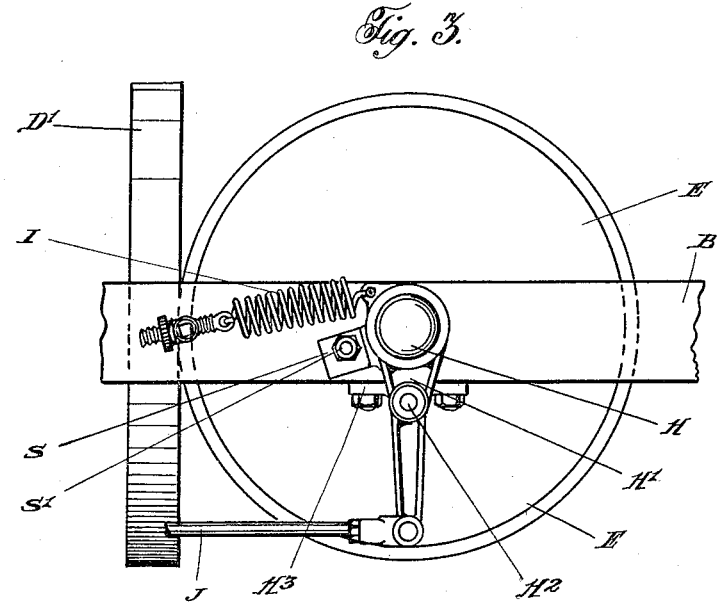
Figs. 3 and 4 are elevation and end view respectively of the operating lever and friction disks.
Figure 4:
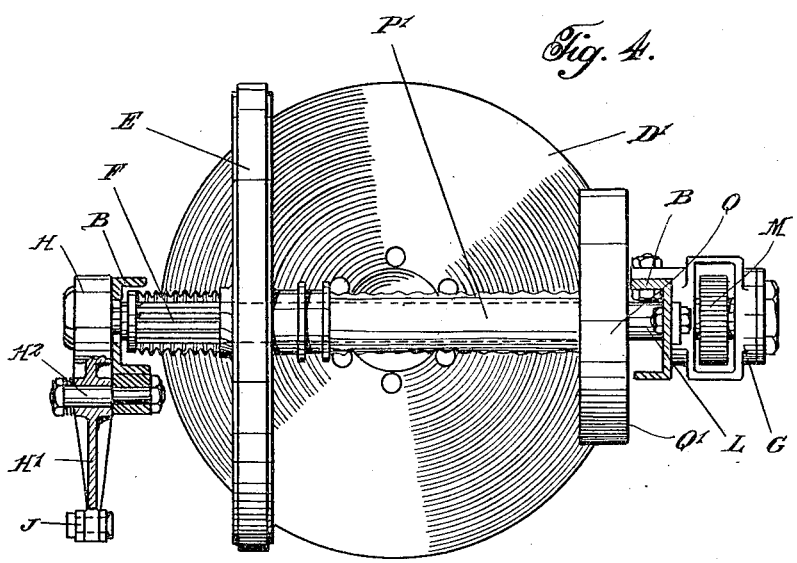

Any convenient means may be employed for effecting the sliding movement of the disk E for changing speed and reversing; in the example illustrated the disk is operated by the lever R, see Fig. 1, and in dotted lines in Fig. 2. The lever R is connected by the link R$^1$ to the ring R$^2$ fitting a grooved socket in the hub of the disk E.

Figure 5:
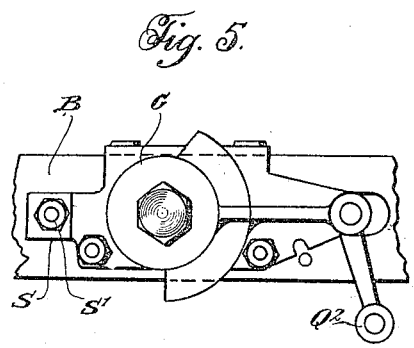
Figs. 5 and 6 are end view and elevation respectively of the main bearing.
Figure 6:
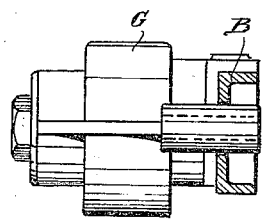

Means are provided for taking up wear of the frictional edge of the disk, see Fig. 5. The rectangular adjusting piece S is fitted eccentrically on the bolt S$^1$, so that when the nut is slackened, and the nuts holding the main bearing G have been slackened, the adjusting piece S is turned on the bolt and another side of same then engages and holds the main bearing in a new position. The distance from the center to the sides of the piece S progressively increases on turning it in one direction.

What I do claim as my invention and desire to secure by Letters Patent is:—

1. In a motor vehicle, the combination with a main frame of the vehicle, of a subframe of subtantially U-shaped formation, the subframe being connected at its open end at each side thereof with the main frame, and the opposite closed end of the subframe being connected at a single point centrally of the sides thereof to the main frame, a motor and frictional transmission gearing mounted on the subframe, the frictional transmission gearing being located at the closed end portion of the subframe adjacent the single point connection thereof with the main frame, said frictional transmission comprising a shaft located transversely of the subframe at the closed end portion, a friction wheel supported for rotation upon said shaft, and a coöperating friction disk connected with the power shaft of the motor, said power shaft extending longitudinally of the subframe in longitudinal alinement with the single point connection of the subframe.

2. In a motor vehicle, the combination with a main frame, of a sub-frame having a three point connection with the main frame, a motor and a frictional transmission gearing mounted on the sub-frame, said frictional transmission gearing including a driven friction disk, a two part shaft, a flexible connection between the adjoining ends of the shaft, bearings on the sub-frame for said shaft, one of said bearings being supported for rocking movement, a friction wheel slidable on said shaft and adapted to be moved into and out of engagement with the friction disk, and means for adjusting the rocking bearing to position one disk into and out of engagement with the other disk.

3. In a motor vehicle, the combination with a main frame, of a sub-frame having a three point connection with the main frame, a motor and a frictional transmission gearing including a driven friction disk, a two part shaft, a flexible connection between the adjoining ends of the shaft, one of the adjoining end portions of said shaft having a cylindrical hollow extension, and the other portion of the shaft being provided with a head having a curved surface fitting the said hollow extension, bearings on the subframe for said shaft, one of said bearings being supported for rocking movement, a friction wheel slidable on said shaft and adapted to be moved into and out of engagement with the friction disk, and means for adjusting the rocking bearing to position one disk into and out of engagement with the other disk.

4. In a motor vehicle, the combination with a main frame, of a sub-frame having a three point connection with the main frame, a motor and a frictional transmission gearing mounted on the sub-frame, said frictional transmission gearing including a driven friction disk, a two part shaft, a flexible connection between the adjoining ends of the shaft comprising opposed disks of flexible material secured together at their peripheral edges and each connected respectively with one of the adjoining ends of the shaft, bearings on the sub-frame for said shaft, one of said bearings being supported for rocking movement, a friction wheel slidable on said shaft and adapted to be moved into and out of engagement with the driving disk, means for adjusting the rocking bearing to position the disk into and out of engagement with the driving disk, and a collapsible spring cover for the sliding surface of the said shaft.

5. In a motor vehicle, the combination with a main frame, of a sub-frame having a three point connection with the main frame, a motor and a frictional transmission gearing mounted on the sub-frame, said frictional transmission gearing including a driven friction disk, a two part shaft, a flexible connection between the adjoining ends of the shaft comprising opposed disks of flexible material secured together at their peripheral edges and each connected respectively with one of the adjoining ends of the shaft, bearings on the sub-frame for said shaft, one of said bearings being supported for rocking movement, a friction wheel slidable on said shaft and adapted to be moved into and out of engagement with the friction disk, means for adjusting the rocking bearing to position the disk into and out of engagement with the driving disk, and a collapsible spring cover for the sliding surface of the said shaft, said collapsible spring cover comprising spiral expansion springs at each side of the driven disk, and flexible cover members connected with the spiral springs.

PERCY WOODTHORPE.

Witnesses:
J. D. ROOTS,
H. D. JAMESON.

Copies of this patent may be obtained for five cents each, by addressing the "Commissioner of Patents, Washington, D. C."